United States Patent [19]

Schlegel

[11] 4,025,983
[45] May 31, 1977

[54] WINDSHIELD WIPER SQUEEGEE

[75] Inventor: Paul D. Schlegel, Boulder, Colo.

[73] Assignee: The Gates Rubber Company, Denver, Colo.

[22] Filed: Sept. 2, 1975

[21] Appl. No.: 609,275

[52] U.S. Cl. ............................................. 15/250.36
[51] Int. Cl.² ............................................. B60S 1/38
[58] Field of Search ................... 15/250.36–250.42, 15/250.01–250.09, 245

[56] References Cited

UNITED STATES PATENTS

| | | | |
|---|---|---|---|
| 2,821,732 | 2/1958 | Scinta | 15/250.42 |
| 2,866,219 | 12/1958 | Scinta | 15/250.42 |
| 3,177,514 | 4/1965 | Wise | 15/250.42 |
| 3,473,186 | 10/1969 | Mainka | 15/250.36 |
| 3,785,002 | 1/1974 | Quinlan et al. | 15/250.36 |
| 3,882,567 | 5/1975 | Herzog | 15/250.36 |
| 3,903,560 | 9/1975 | Jewell et al. | 15/250.36 |
| 3,935,612 | 2/1976 | Wittwer | 15/250.42 |

*Primary Examiner*—Peter Feldman
*Attorney, Agent, or Firm*—Curtis H. Castleman, Jr.; H. W. Oberg, Jr.; Raymond Fink

[57] ABSTRACT

A squeegee for use in a windshield wiper apparatus includes a wiping portion which has a smoothly tapered shank, tapering from a first thickness to a reduced second thickness, the quotient defined by the difference of the first thickness minus the second thickness divided by the first thickness being approximately 0.6 whereby the shank simulates a constant stress beam to preclude stress concentration areas in the squeegee.

1 Claim, 1 Drawing Figure

WINDSHIELD WIPER SQUEEGEE

BACKGROUND OF THE INVENTION

This invention relates to windshield wiping apparatus and particularly to squeegees (wiping elements) used in conjunction therewith.

Windshield wiper squeegees customarily are composed of an elastomeric molded or extruded element having a retention bead, for engagement with the remainder of the windshield wiper, joined to an elongated wiping portion through a reduced neck. The wiping portion is customarily provided with a series of stair-stepped wiping surfaces along its shank which, upon lay-over of the squeegee during wiping, supposedly assist the terminal wiping lip in the wiping function. Other types of squeegees have either curved or substantially straight shank portions, however, these shank portions have generally not been designed to withstand ozone attack particularly at stress concentration portions along the shank. It has been found that ozone in the atmosphere attacks the areas which are under maximum stress concentration, creating cracks in the squeegee which lead to premature failure of the wiping member. To compensate for this problem, many wiping elements employ overly thickened cross sections which may retard the failure problem, at the expense of increased materials cost.

It is the primary object of this invention to produce a wiping element which has a shank portion designed to minimize, if not eliminate, stress concentration areas for increased life and resistance to chemical attack, while simultaneously using a minimum of material to achieve the correct wiping angle during operation.

SUMMARY OF THE INVENTION

Briefly, the elastomeric squeegee of the invention includes a retention portion for attaching the squeegee in operative association with the remainder portions of the windshield wiper; a wiping portion comprising a shank smoothly tapering from a thickness of $t_1$ to a reduced thickness of $t_2$, the shank terminating in and connected to a wiping lip; and a reduced neck joining the retention and wiping portions. The shank taper is determined by the relationship $0.55 \leq (t_1-t_2/t_1) \leq 0.65$.

BRIEF DESCRIPTION OF THE DRAWINGS

The invention in its preferred embodiment will be described with reference to the accompanying single FIGURE 1 illustrating in end view the squeegee of the invention, in cooperation with associated windshield wiper structure.

PREFERRED EMBODIMENTS OF THE INVENTION

Figure 1:
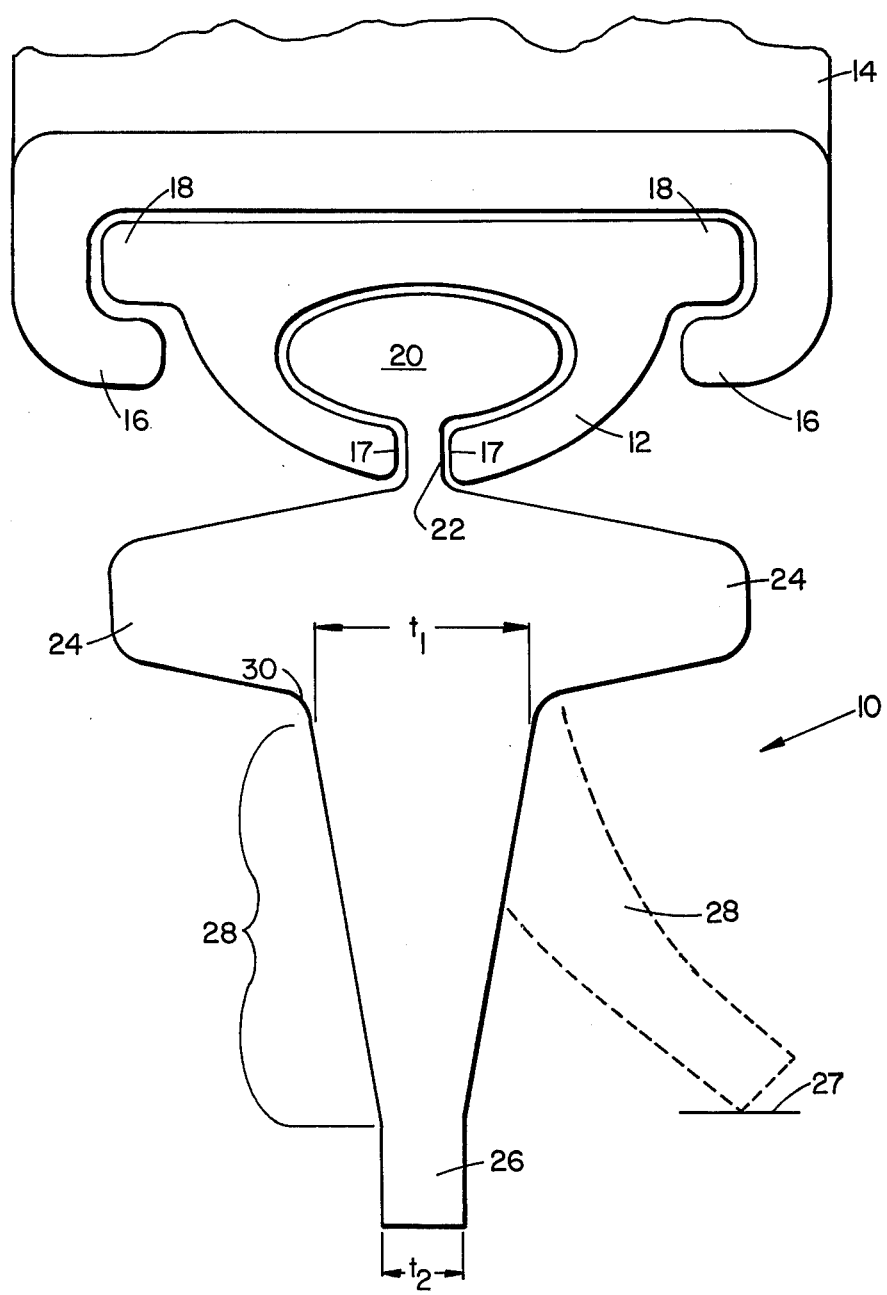

Referring to the single FIGURE, the windshield wiper blade assembly is generally composed of a squeegee or wiping element 10 in operative association with the remainder of the windshield wiper structure composed of backing member 12 and a pressure applying superstructure 14. Loading to the entire wiper structure is supplied by a wiper arm (not shown) which attaches in the usual manner to the superstructure 14 intermediate its ends. The superstructure is provided with spaced claw means 16 which embrace flange portions 18 of the backing member preferably permitting a sliding longitudinal engagement therewith.

The squeegee 10 includes a longitudinally extending retention portion such as bead 20 which is contained within a corresponding longitudinal chamber or cavity formed in the backing strip 12. Means, not shown, are provided to prevent the squeegee from becoming disengaged from the backing strip. This retention portion of the squeegee is connected to the wiping portion of the squeegee (which is disposed below the spaced apart and inwardly directed webs 17 of the backing strip) by a reduced neck 22. The wiping portion of the squeegee is in turn comprised of outwardly directed ribs or flanges 24 connected to a terminal wiping lip 26 through an intermediate tapered shank 28. The connection areas between the various portions of the squeegee, such as at 30, are properly filleted and radiused to avoid stress concentrations in these areas.

In accordance with the invention, shank portion 28 smoothly tapers toward the wiping lip 26 from a first, maximum thickness $t_1$ to a reduced, minimum thickness $t_2$ at the joining with the wiping lip portion. It is preferred that this tapered portion is substantially straight on both sides. In accordance with the invention, the taper coefficient, hereinafter defined, of the shank portion is within the range of about 0.55 to about 0.65. In a preferred embodiment, the taper coefficient is substantially 0.6. The taper coefficient $k$ is determined by the following relationship:

$$k = t_1-t_2/t_1$$

It has been found that by utilizing a taper coefficient $k$ of about 0.6 it is possible to produce an essentially constant stress beam where there are virtually no stress concentrations along the full extent of the beam (shank) so that the entire squeegee 10 is free from stress concentrations. The entire shank bends (strains) uniformly during use on a windshield 27, as shown in phantom in the drawing, and no one portion of the shank is over strained. This result is extremely advantageous as the propensity for attack by ozone, to cause cracking and propogation of the cracking along the squeegee surface, is greatly increased in stress concentrated areas of the squeegee.

The squeegee may be formed from various elastomeric materials, such as molded or extruded rubber or rubber-like substances compounded for use as a wiping element resistant to weather and other outdoor influences.

A variety of variations and modifications will become apparent to those skilled in the art upon a reading of the specification, and are intended to be encompassed within the scope of the claims appended hereto.

What is claimed is:

1. An elastomeric squeegee for use in a windshield wiper, comprising:

a retention portion for attaching the squeegee in operative association with the remainder of the windshield wiper;

a wiping element portion comprising the side flanges of uniform cross section along the length of the squeegee, to which is connected a shank having substantially straight sided surfaces and smoothly tapering from a maximum thickness of $t_1$ measured at the intersection of the shank with the flanges to a reduced minimum thickness of $t_2$, the shank terminating in a wiping lip connected to its said reduced thickness portion; and a reduced neck joining said retention portion to said wiping portion;

said shank taper being determined by a taper coefficient $k$ of substantially 0.6., but not to exceed 0.6, wherein $k = t_1-t_2/t_1$.

* * * * *

UNITED STATES PATENT OFFICE
CERTIFICATE OF CORRECTION

PATENT NO. : 4,025,983
DATED : May 31, 1977
INVENTOR(S) : Paul D. Schlegel

It is certified that error appears in the above-identified patent and that said Letters Patent are hereby corrected as shown below:

Column 1, line 43, insert "[ ]" on either side of "$t_1-t_2$" -- .

Column 2, line 25, insert "( )" on either side of "$t_1-t_2$" --

Column 2, line 55, after "comprising" delete "the" -- .

Column 2, line 68, insert "( )" on either side of "$t_1-t_2$" -- .

Signed and Sealed this sixteenth Day of August 1977

[SEAL]

Attest:

RUTH C. MASON
Attesting Officer

C. MARSHALL DANN
Commissioner of Patents and Trademark.